US009406327B2

(12) United States Patent
Hinoue et al.

(10) Patent No.: US 9,406,327 B2
(45) Date of Patent: Aug. 2, 2016

(54) GRANULAR MEDIA WITH A HIGH-HK ASSIST LAYER FOR MICROWAVE-ASSISTED MAGNETIC RECORDING

(71) Applicant: HGST Netherlands B.V., Amsterdam (NL)

(72) Inventors: Tatsuya Hinoue, Odawara (JP); Ichiro Tamai, Odawara (JP); Hiroaki Nemoto, Odawara (JP)

(73) Assignee: HGST Netherlands B.V., Amsterdam (NL)

( * ) Notice: Subject to any disclaimer, the term of this patent is extended or adjusted under 35 U.S.C. 154(b) by 217 days.

(21) Appl. No.: 14/015,824

(22) Filed: Aug. 30, 2013

(65) Prior Publication Data
US 2015/0062745 A1 Mar. 5, 2015

(51) Int. Cl.
*G11B 5/66* (2006.01)
*G11B 5/65* (2006.01)
G11B 5/00 (2006.01)
G11B 5/31 (2006.01)

(52) U.S. Cl.
CPC .. *G11B 5/66* (2013.01); *G11B 5/65* (2013.01); *G11B 5/314* (2013.01); *G11B 2005/0024* (2013.01)

(58) Field of Classification Search
None
See application file for complete search history.

(56) References Cited

U.S. PATENT DOCUMENTS

| | | | |
|---|---|---|---|
| 6,680,106 B1 | 1/2004 | Thangaraj et al. | |
| 6,744,583 B2 | 6/2004 | Ikeda et al. | |
| 6,821,596 B2 | 11/2004 | Terao et al. | |
| 6,893,746 B1 | 5/2005 | Kirino et al. | |
| 7,429,427 B2 | 9/2008 | Wu et al. | |
| 7,488,545 B2* | 2/2009 | Fullerton | G11B 5/65 428/828.1 |
| 7,498,092 B2 | 3/2009 | Berger et al. | |
| 7,550,210 B2 | 6/2009 | Berger et al. | |
| 8,000,060 B2 | 8/2011 | Zhang et al. | |
| 8,329,321 B2* | 12/2012 | Takenoiri | G11B 5/66 428/828 |
| 9,142,240 B2* | 9/2015 | Nolan | G11B 5/66 |

(Continued)

FOREIGN PATENT DOCUMENTS

JP 5217143 A 8/1993
JP 4960319 B2 3/2012

OTHER PUBLICATIONS

Nozaki et al., "Microwave-assisted magnetization reversal in a Co/Pd multilayer with perpendicular magnetic anisotropy," 2009 American Institute of Physics, Applied Physics Letter, vol. 95, Issue 8, 2009, pp. 1-3.

*Primary Examiner* — Kevin Bernatz
(74) *Attorney, Agent, or Firm* — Zilka-Kotab, PC (57) ABSTRACT

In one embodiment, a magnetic storage device includes at least one microwave assisted magnetic recording (MAMR) head, each MAMR head including a spin torque oscillator (STO), a magnetic recording medium, a drive mechanism for passing the magnetic medium over the at least one MAMR head, and a controller electrically coupled to the at least one MAMR head for controlling operation of the at least one MAMR head, wherein the magnetic recording medium includes a recording layer positioned directly or indirectly above a substrate and an assist layer positioned above the recording layer, wherein the recording layer includes at least Co, Pt, and an oxide or oxygen, wherein the assist layer is positioned closer to the at least one MAMR head and includes at least Co and Pt, and wherein at least a portion of the recording layer has a smaller anisotropic magnetic field than the assist layer.

19 Claims, 7 Drawing Sheets

(56) References Cited

U.S. PATENT DOCUMENTS

| | | | |
|---|---|---|---|
| 9,224,411 B1* | 12/2015 | Gao | G11B 5/66 |
| 2004/0166371 A1* | 8/2004 | Berger | G11B 5/66 |
| | | | 428/828.1 |
| 2006/0222901 A1* | 10/2006 | Inamura | G11B 5/65 |
| | | | 428/827 |
| 2008/0117545 A1 | 5/2008 | Batra et al. | |
| 2008/0199735 A1* | 8/2008 | Berger | G11B 5/66 |
| | | | 428/828.1 |
| 2009/0073599 A1* | 3/2009 | Nemoto | G11B 5/65 |
| | | | 360/77.02 |
| 2009/0310254 A1* | 12/2009 | Oikawa | B82Y 10/00 |
| | | | 360/110 |
| 2010/0110576 A1* | 5/2010 | Akagi | B82Y 10/00 |
| | | | 360/59 |
| 2010/0142084 A1* | 6/2010 | Nemoto | B82Y 10/00 |
| | | | 360/77.02 |
| 2012/0147718 A1* | 6/2012 | Hellwig | G11B 5/66 |
| | | | 369/13.33 |
| 2012/0251845 A1* | 10/2012 | Wang | G11B 5/66 |
| | | | 428/827 |

\* cited by examiner

GRANULAR MEDIA WITH A HIGH-HK ASSIST LAYER FOR MICROWAVE-ASSISTED MAGNETIC RECORDING

FIELD OF THE INVENTION

The present invention relates to a magnetic storage device that uses microwave-assisted magnetic recording (MAMR) to enable recording a large amount of information, and in particular, it relates to granular media with a high-Hk assist layer.

BACKGROUND

The heart of a computer is a magnetic hard disk drive (HDD) which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The volume of information processing in the information age is increasing rapidly. In particular, it is desired that HDDs be able to store more information in their limited area and volume. A technical approach to this desire is to increase the capacity by increasing the recording density of the HDD. To achieve higher recording density, further miniaturization of recording bits is effective, which in turn typically requires the design of smaller and smaller components.

The further miniaturization of the various components, however, presents its own set of challenges and obstacles. Finer ferromagnetic crystal grains in recording media and noise reduction are effective ways to raise the recording density. However, as the size of the crystal grains decreases, the recording magnetization becomes thermally unstable, and thermal demagnetization, e.g., degradation, arises in the output signal and the read/write characteristics of the magnetic storage device deteriorate over time. An effective method to prevent thermal demagnetization is to increase the magneto-crystalline anisotropy of the ferromagnetic crystal grains, but a large magnetic field is required at the magnetic head to enable recording on a medium having large magneto-crystalline anisotropy.

A narrower track width in the magnetic head is also effective to achieve high recording density. However, as the track width in the magnetic head becomes narrower, the recording magnetic field of the magnetic head becomes smaller. This phenomenon is referred to as the "trilemma" of high recording densities and hinders the development of high recording densities when using conventional technologies.

Microwave-assisted magnetic recording (MAMR) is capable of recording to a medium having high magneto-crystalline anisotropy, and may be used to overcome this trilemma. MAMR incorporates a microwave magnetic field oscillation element into the recording head and records by superimposing a microwave magnetic field on the recording magnetic field of the head. Ferro-magnetic resonance (FMR) occurs when the frequency of the microwave magnetic field matches the resonance frequency of the magnetization of the medium and the spin precession is further activated. This FMR is able to lower the energy barrier to magnetization reversal. An element referred to as a spin torque oscillator (STO) that is separated from ferromagnetic thin films by non-magnetic layers may be used as a microwave magnetic field oscillation element. This structure, when placed between the main magnetic pole and the trailing shields, forms a MAMR recording head.

Because FMR is used in MAMR, it is important to appropriately control the magnetic characteristics of the medium such that they correspond to the frequencies of the microwave magnetic field in order to obtain a high assist effect. For example, Japanese Patent Office (JPO) Patent No. 4960319 proposes a magnetic recording device provided with a magnetic recording head that has a main magnetic pole and a spin torque oscillator arranged close to the main magnetic pole and includes at least two magnetic layers of a spin injection layer and an oscillation layer, and a magnetic recording medium that includes the two magnetic layers of a recording layer and an antenna layer, where at least the recording layer is a hard magnetic material, the antenna layer is formed at a position closer to the magnetic recording head than the recording layer, the resonance frequency, fa, of the antenna layer is lower than the resonance frequency, fr, of the recording layer, the recording layer and the antenna layer are ferromagnetically coupled, and the resonance frequency of the antenna layer is larger than the resonance frequency of the oscillation layer. This is capable of obtaining a high assist effect by using a microwave magnetic field.

However, it is not sufficient to only implement a high assist effect due to the microwave magnetic field in order to use MAMR and achieve a high recording density. If the magnetic characteristics of the medium are not appropriately controlled to correspond to the recording magnetic field of the head, satisfactory recording characteristics will not be obtained even if a high assist effect is obtained.

SUMMARY

In one embodiment, a magnetic recording medium includes a recording layer positioned directly or indirectly above a substrate, the recording layer including at least Co, Pt, and an oxide or oxygen, and an assist layer positioned above the recording layer, the assist layer being positioned closer to an air bearing surface (ABS) of a magnetic head than the recording layer, the assist layer including at least Co and Pt, wherein at least a portion of the recording layer has a smaller anisotropic magnetic field than the assist layer.

In another embodiment, a magnetic storage device includes at least one microwave assisted magnetic recording (MAMR) head, each MAMR head including a spin torque oscillator (STO), a magnetic recording medium, a drive mechanism for passing the magnetic medium over the at least one MAMR head, and a controller electrically coupled to the at least one MAMR head for controlling operation of the at least one MAMR head, wherein the magnetic recording medium includes a recording layer positioned directly or indirectly above a substrate and an assist layer positioned above the recording layer, wherein the recording layer includes at least Co, Pt, and an oxide or oxygen, wherein the assist layer is positioned closer to the at least one MAMR head and includes at least Co and Pt, and wherein at least a portion of the recording layer has a smaller anisotropic magnetic field than the assist layer.

In another embodiment, a method for forming a magnetic recording medium includes forming a recording layer directly or indirectly above a substrate, the recording layer including at least Co, Pt, and an oxide or oxygen, and forming an assist layer above the recording layer, the assist layer including at least Co and Pt, wherein at least a portion of the recording layer has a smaller anisotropic magnetic field than the assist layer.

Any of these embodiments may be implemented in a magnetic data storage system such as a disk drive system, which may include a magnetic head, a drive mechanism for passing a magnetic storage medium (e.g., hard disk) over the head, and a control unit electrically coupled to the head for controlling operation of the head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

According to one embodiment, satisfactory recording characteristics to enable high recording densities may be achieved while obtaining a high assist effect by the microwave magnetic field by appropriately controlling the magnetic characteristics of the medium.

In one general embodiment, a magnetic recording medium includes a recording layer positioned directly or indirectly above a substrate, the recording layer including at least Co, Pt, and an oxide or oxygen, and an assist layer positioned above the recording layer, the assist layer being positioned closer to an air bearing surface (ABS) of a magnetic head than the recording layer, the assist layer including at least Co and Pt, wherein at least a portion of the recording layer has a smaller anisotropic magnetic field than the assist layer.

In another general embodiment, a magnetic storage device includes at least one microwave assisted magnetic recording (MAMR) head, each MAMR head including a spin torque oscillator (STO), a magnetic recording medium, a drive mechanism for passing the magnetic medium over the at least one MAMR head, and a controller electrically coupled to the at least one MAMR head for controlling operation of the at least one MAMR head, wherein the magnetic recording medium includes a recording layer positioned directly or indirectly above a substrate and an assist layer positioned above the recording layer, wherein the recording layer includes at least Co, Pt, and an oxide or oxygen, wherein the assist layer is positioned closer to the at least one MAMR head and includes at least Co and Pt, and wherein at least a portion of the recording layer has a smaller anisotropic magnetic field than the assist layer.

In another general embodiment, a method for forming a magnetic recording medium includes forming a recording layer directly or indirectly above a substrate, the recording layer including at least Co, Pt, and an oxide or oxygen, and forming an assist layer above the recording layer, the assist layer including at least Co and Pt, wherein at least a portion of the recording layer has a smaller anisotropic magnetic field than the assist layer.

Figure 1:
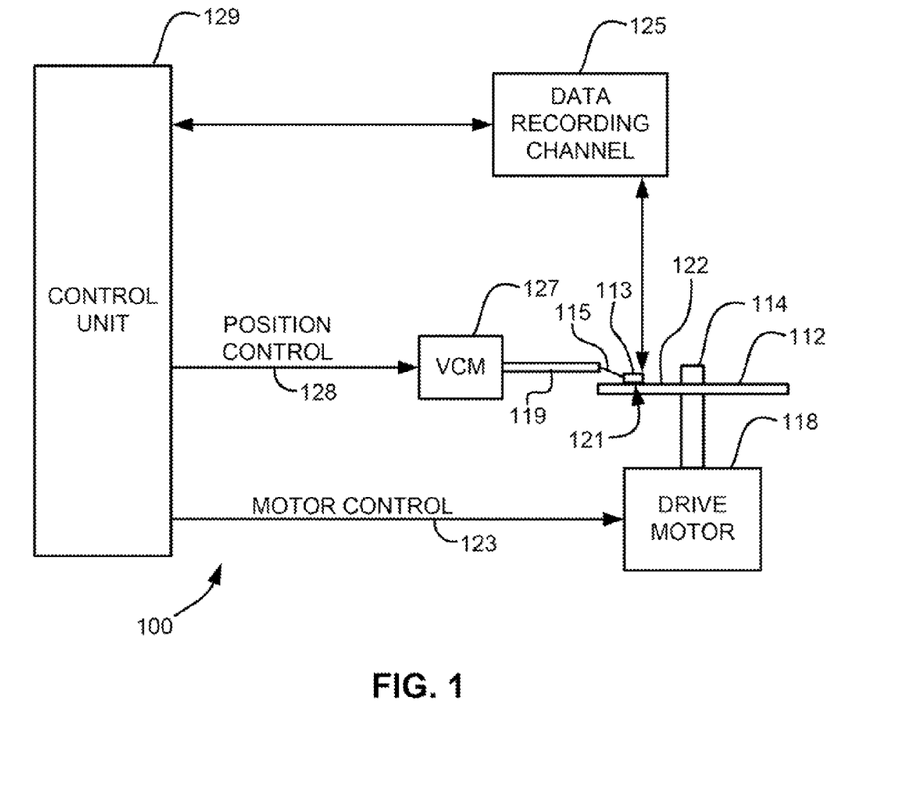
FIG. 1 is a simplified drawing of a magnetic recording disk drive system.

Referring now to FIG. 1, there is shown a disk drive 100 in accordance with one embodiment of the present invention. As shown in FIG. 1, at least one rotatable magnetic medium (e.g., magnetic disk) 112 is supported on a spindle 114 and rotated by a drive mechanism, which may include a disk drive motor 118. The magnetic recording on each disk is typically in the form of an annular pattern of concentric data tracks (not shown) on the disk 112. Thus, the disk drive motor 118 preferably passes the magnetic disk 112 over the magnetic read/write portions 121, described immediately below.

At least one slider 113 is positioned near the disk 112, each slider 113 supporting one or more magnetic read/write portions 121, e.g., of a magnetic head according to any of the approaches described and/or suggested herein. As the disk rotates, slider 113 is moved radially in and out over disk surface 122 so that portions 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by controller 129, such as access control signals and internal clock signals. Typically, control unit 129 comprises logic control circuits, storage (e.g., memory), and a microprocessor. In a preferred approach, the control unit 129 is electrically coupled (e.g., via wire, cable, line, etc.) to the one or more magnetic read/write portions 121, for controlling operation thereof. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write portions 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write portion includes a coil layer embedded in one or more insulation layers (insulation stack), the insulation stack being located between first and second pole piece layers. A gap is formed between the first and second pole piece layers by a gap layer at an ABS of the write portion. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

Figure 2A:
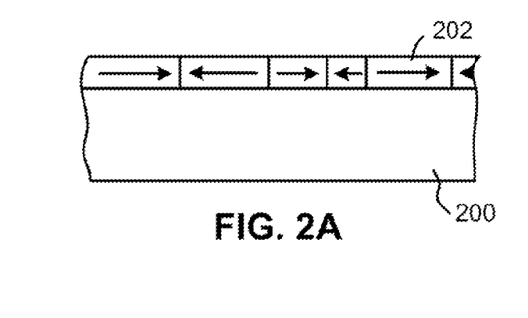
FIG. 2A is a schematic representation in section of a recording medium utilizing a longitudinal recording format.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

Figure 2B:
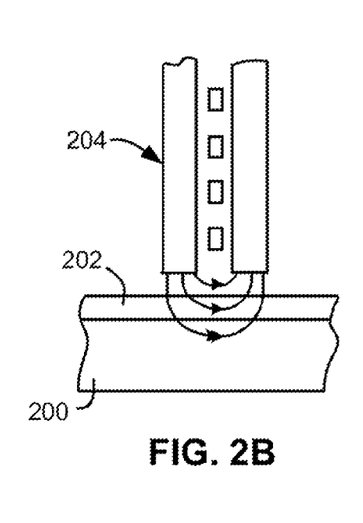
FIG. 2B is a schematic representation of a conventional magnetic recording head and recording medium combination for longitudinal recording as in FIG. 2A.

FIG. 2B shows the operative relationship between a conventional read/write head 204, which may preferably be a thin film head, and a conventional recording medium, such as that of FIG. 2A.

Figure 2C:
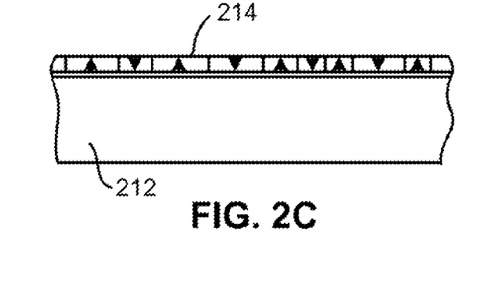
FIG. 2C is a magnetic recording medium utilizing a perpendicular recording format.

FIG. 2C illustrates, schematically, the orientation of magnetic impulses substantially perpendicular to the surface of a recording medium as used with magnetic disc recording systems, such as that shown in FIG. 1. For such perpendicular recording, the medium typically includes an under layer 212 of a material having a high magnetic permeability. This under layer 212 is then provided with an overlying coating 214 of magnetic material preferably having a high coercivity relative to the under layer 212.

Figure 2D:
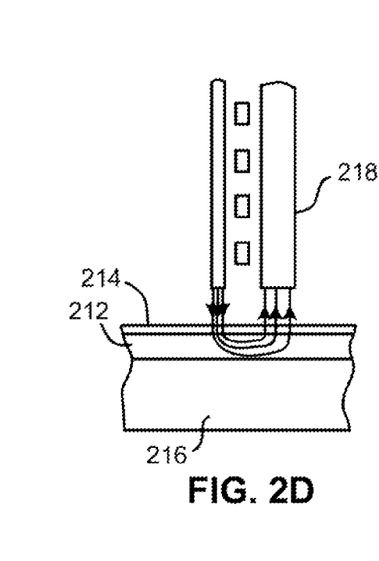
FIG. 2D is a schematic representation of a recording head and recording medium combination for perpendicular recording on one side.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium (soft magnetic under layer) causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the under layer 212 back to the return layer (P1) of the head 218.

Figure 2E:
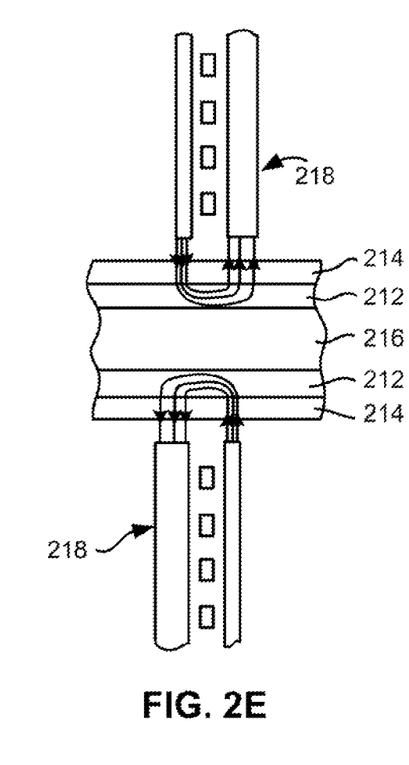
FIG. 2E is a schematic representation of a recording apparatus adapted for recording separately on both sides of the medium.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

Figure 3A:
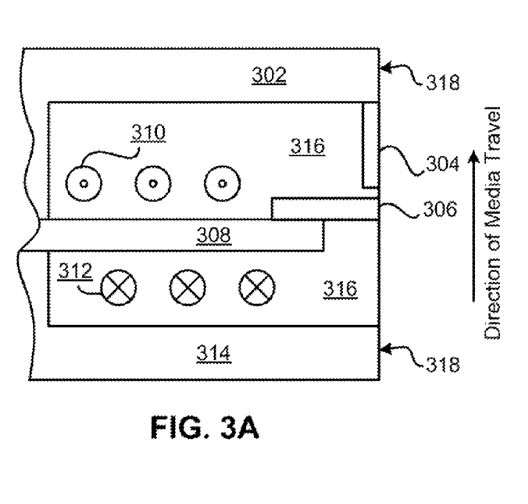
FIG. 3A is a cross-sectional view of one particular embodiment of a perpendicular magnetic head with helical coils.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole (shield) 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

Figure 3B:
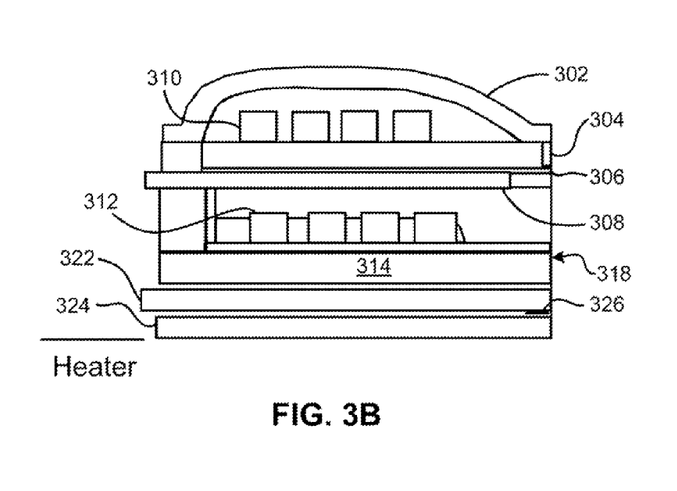
FIG. 3B is a cross-sectional view of one particular embodiment of a piggyback magnetic head with helical coils.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

Figure 4A:
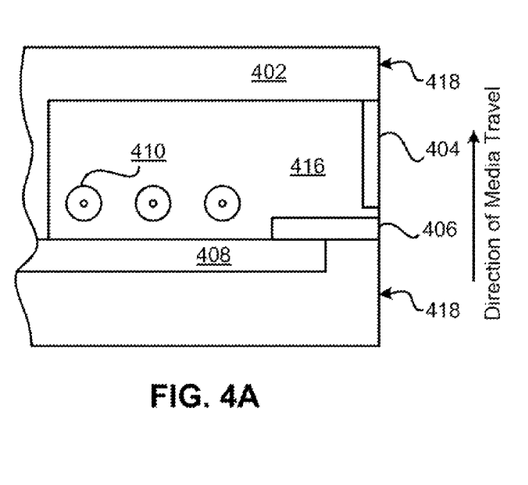
FIG. 4A is a cross-sectional view of one particular embodiment of a perpendicular magnetic head with looped coils.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

Figure 4B:
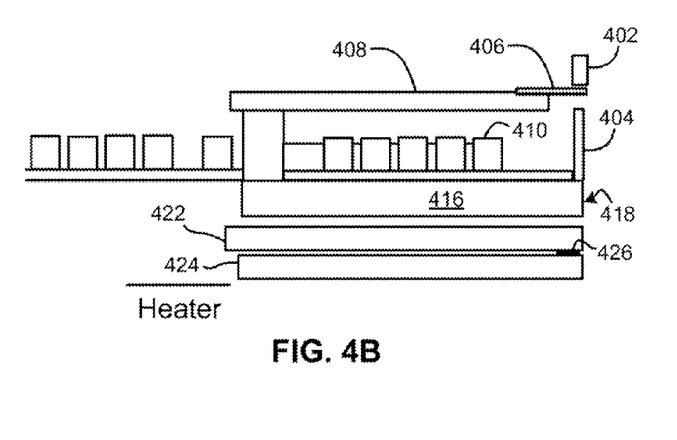
FIG. 4B is a cross-sectional view of one particular embodiment of a piggyback magnetic head with looped coils.

FIG. 4B illustrates another type of piggyback magnetic head having similar features to the head of FIG. 4A including a looped coil 410, which wraps around to form a pancake coil. Also, sensor shields 422, 424 are shown. The sensor 426 is typically positioned between the sensor shields 422, 424.

In FIGS. 3B and 4B, an optional heater is shown near the non-ABS side of the magnetic head. A heater (Heater) may also be included in the magnetic heads shown in FIGS. 3A and 4A. The position of this heater may vary based on design parameters such as where the protrusion is desired, coefficients of thermal expansion of the surrounding layers, etc.

Except as otherwise described herein, the various components of the structures of FIGS. 3A-4B may be of conventional materials and design, as would be understood by one skilled in the art.

In order to achieve satisfactory recording characteristics that enable high recording densities while obtaining a high assist effect by the microwave magnetic field, a magnetic storage device, in one embodiment, comprises a magnetic recording medium and a magnetic head equipped with a microwave magnetic field oscillation element, such as a STO. The magnetic recording medium comprises a recording layer directly and indirectly formed above a substrate and an assist layer positioned closer to the ABS of the magnetic head than the recording layer. The recording layer comprises at least Co, Pt, and an oxide of some material (oxygen). The assist layer comprises at least Co and Pt. The recording layer may be fabricated from a plurality of magnetic layers, in one approach. At least one of the magnetic layers has a smaller anisotropic magnetic field than the assist layer, and at least one of the plurality of magnetic layers that form the recording layer has a smaller included content of Pt than the assist layer, in various approaches.

A relationship between an anisotropic magnetic field, $H_{k\_ass}$, of the assist layer, an average value, $M_{s\_ave}$, of the saturation magnetizations of the assist layer and the recording layer, and a recording magnetic field, $H_h$, of the head may be $H_{k\_ass} - 4\pi M_{s\_ave} - H_h > 0$, according to one embodiment, in order to provide greater recording performance.

A relationship between the anisotropic magnetic field, $H_{k\_ass}$, of the assist layer, the average value, $M_{s\_ave}$, of the saturation magnetizations of the assist layer and the recording layer, and a coercive force, $H_c(t_0)$, of the magnetic recording medium at the magnetic field sweep time, $t_0$, determined from recording frequency may be $H_{k\_ass} - 4\pi M_{s\_ave} - H_0(t_0) > 0$, in accordance with another embodiment.

In another embodiment, a film thickness of the recording layer may be about twice that of a film thickness of the assist layer or more. In another approach, an anisotropy magnetic field of the assist layer may be about 14 kOe or more. Also, exchange coupling control layers may be arranged between a plurality of magnetic layers forming a recording layer and between an assist layer and a recording layer, according to another approach.

Figure 5:
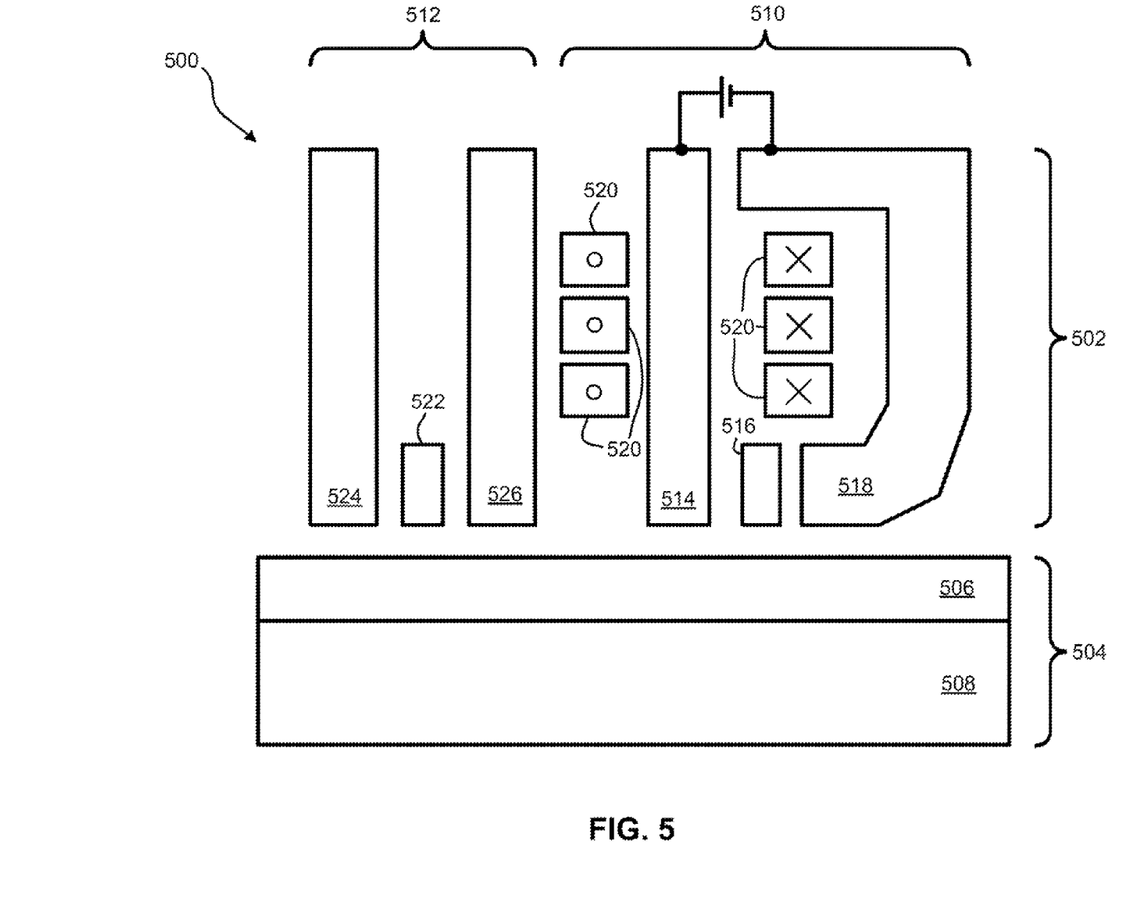
FIG. 5 shows a cross-sectional view of a magnetic head and magnetic recording medium related to a magnetic storage device according to one embodiment.

FIG. 5 shows a cross-sectional view of a magnetic head 502 and a magnetic recording medium 504 which may be included in a magnetic storage device 500 according to one embodiment. The magnetic storage device 500 is a structure that includes the magnetic recording medium 504 and at least one magnetic head 502 adapted for being positioned above (flying above) the magnetic recording medium 504. The magnetic recording medium 504 comprises an assist layer 506 positioned above a recording layer 508. The magnetic head 502 comprises one or both of a write head 510 and a read head 512. The write head 510 comprises a STO 516 adapted for generating a microwave magnetic field, a main magnetic pole 514 adapted for generating a recording magnetic field and writing data to the magnetic recording medium 504, at least one magnetic shield 518, and a coil 520 for exciting these components, the coil being shown in cross-section such that it appears entering and exiting the page. The read head 512 comprises a read sensor 522, a trailing shield 524, and a leading shield 526, and is adapted for reading data from the magnetic recording medium 504.

The magnetic storage device 500 may include more or less components than those shown in FIG. 5, as would be understood by one of skill in the art, such as multiple numbers of read heads 512, write heads 510, more shields, interconnects, channels, etc., may be included in the magnetic storage device 500.

Figure 6:
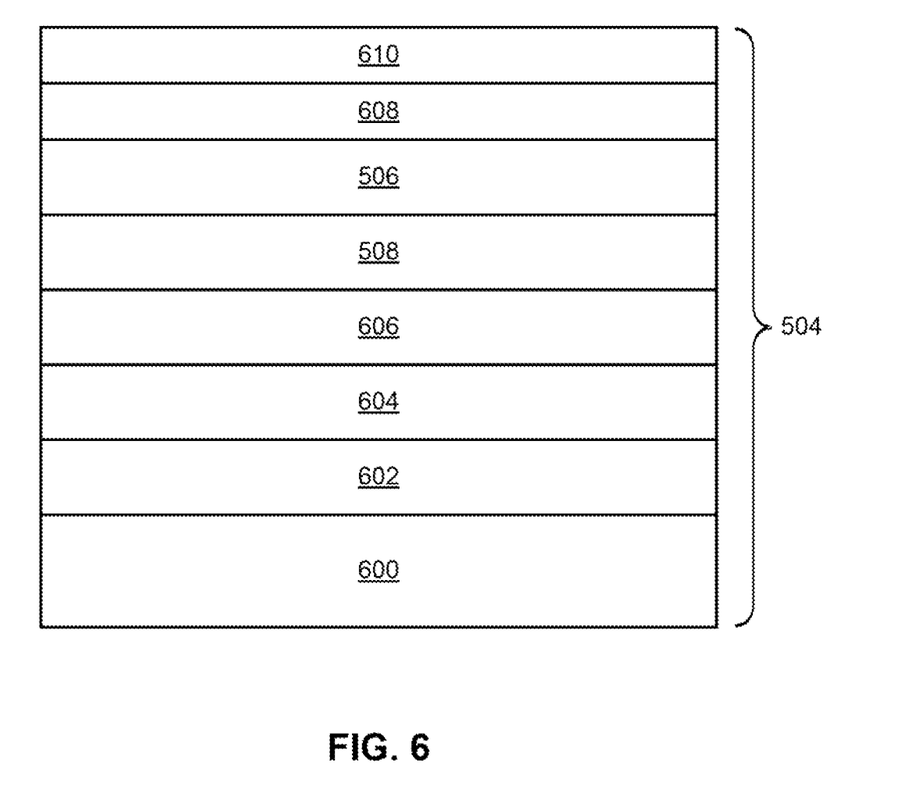
FIG. 6 shows a cross-sectional view of a magnetic recording medium according to one embodiment.

Now referring to FIG. 6, a layered structure of the magnetic recording medium 504 is shown according to one embodiment. An adhesive layer 602 is positioned above a substrate 600, a soft magnetic underlayer 604 above the adhesive layer 602, a crystal growth control layer 606 above the soft magnetic underlayer 604, a recording layer 508 above the crystal growth control layer 606, an assist layer 506 above the recording layer 508, an overcoating film 608 above the assist layer 506, and a lubricating film 610 above the overcoating film 608. The lubricating film 610 may not be present on the magnetic recording medium 504 when it is produced, and may be applied on site or at a later time. In one embodiment, these layers may be laminated successively above the substrate 600, with more or less layers being present a possibility.

The overcoating film 608 may comprise any suitable material such as carbon and carbon-based hard coatings, such as diamond-like carbon (DLC), AlTiC, etc.

An amorphous NiTa alloy having a thickness of between about 20 nm and about 40 nm, such as about 30 nm, may be used as the adhesive layer 602 in one approach. The effects of using this material are planarity of the magnetic recording medium 504 and adhesion to the substrate 600 in the adhesive layer 602.

The soft magnetic underlayer 604 may be an anti-ferromagnetically coupled soft magnetic underlayer that includes at least two layers of a soft magnetic alloy having a film thickness of between about 10 nm and about 30 nm, such as about 20 nm, and a non-magnetic material layer, such as Ru, inserted between the layers of the soft magnetic alloy, having a film thickness between about 0.1 nm and about 2 nm, such as about 0.5 nm, in various embodiments. The soft magnetic alloy may be an alloy of FeCoTaZr in one embodiment. The soft magnetic underlayer 604 has the effects of forming a magnetic path for the recording magnetic field and improving recording characteristics of the magnetic head in general. Furthermore, noise may be suppressed by using an anti-ferromagnetic coupling arrangement.

The crystal growth control layer 606 may be fabricated from a face-centered cubic (fcc) material layer, such as a NiCrW alloy or the like, that is laminated between about 5 nm and about 9 nm in thickness, such as about 7 nm, along with a hexagonal close packed (hcp) material layer, such as Ru, laminated to a total thickness of about 10 nm to about 16 nm, such as about 12 nm, in various embodiments. The effects that this layer provides are that the perpendicular orientation of the crystal grains forming the recording layer 508 and the assist layer 506 are promoted and the crystal grain diameters are appropriately controlled. The structure under the crystal growth control layer 606 is a typical or general structure used for magnetic recording media. If similar effects are obtained using other materials and designs, then there are no particular limits on the materials and the structure that are used below the crystal growth control layer 606.

Figure 7:
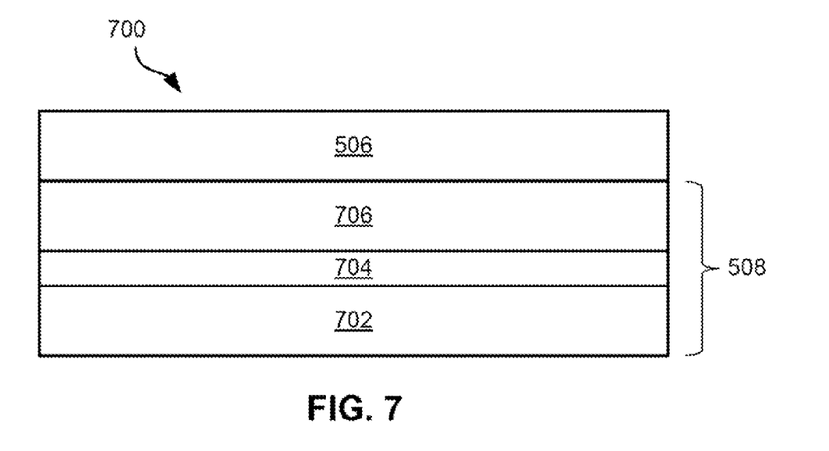
FIG. 7 shows a cross-sectional view of a portion of a magnetic recording medium according to one embodiment.

The recording layer 508 may comprise a laminated structure or a single magnetic layer. Referring now to FIG. 7, a laminated structure 700 is shown according to one embodiment and may be manufactured by successively laminating a first magnetic layer 702, an exchange coupling control layer 704, and a second magnetic layer 706. The first magnetic layer 702, in one embodiment, may comprise a Co-11Cr-19Pt-5SiO$_2$-5TiO$_2$-2Co$_3$O$_4$ alloy (numbers placed before each element indicate the mol % thereof) having an anisotropic magnetic field of about 19.6 kOe and a saturation magnetization of 600 emu/cc that is formed to a thickness of between about 4 nm and about 8 nm, such as about 6 nm, in various embodiments. The exchange coupling control layer 704, in one embodiment, may comprise Ru in a thickness of between about 0.1 nm and about 0.5 nm, such as about 0.2 nm. Also, the second magnetic layer 706, in one embodiment, may comprise a Co-21Cr-14Pt-6SiO$_2$ alloy having an anisotropic magnetic field of about 13.2 kOe and a saturation magnetization of 380 emu/cc in a thickness of between about 3 nm and about 7 nm, such as about 5 nm, in various embodiments.

Referring again to FIG. 6, the assist layer 506 may be a film of a Co alloy, such as a CoCr or CoCrPt alloy, such as Co-20Cr-16Pt having an anisotropic magnetic field of about 16.8 kOe and a saturation magnetization of 390 emu/cc. The thickness of the assist layer 506 may be between about 2 nm and about 6 nm, such as about 4 nm, in various embodiments.

The film thickness of the overcoating film 608 may be from about 1 nm to about 5 nm, such as about 3 nm, and the film thickness of the lubricating film 610 may be from about 0.5 nm to about 2 nm, such as about 1 nm, in various embodiments.

Referring again to FIG. 5, to obtain an assist effect caused by a microwave magnetic field, it is helpful to appropriately control the effective magnetic field in the assist layer 506. The resonance frequency of the assist layer 506 is represented by the product of the effective magnetic field in the assist layer 506 and the gyro magnetic ratio. This means that when the effective magnetic field is negative, the resonance frequency is calculated as a negative value, but this is not resonant. The assist effect is not obtained under a condition with no resonance.

Specifically, the effective magnetic field in the assist layer 506 must be a positive value to obtain the assist effect. The effective magnetic field in the assist layer 506 differs depending on the recording state, but the minimum value is represented by $H_{k\_ass} - 4\pi M_{s\_ave} - H_h$ where the anisotropic magnetic field of the assist layer 506 is $H_{k\_ass}$, the average value of the saturation magnetizations of the assist layer 506 and the recording layer 508 is $M_{s\_ave}$, and the recording magnetic field of the magnetic head 502 during recording is $H_h$. The second term $4\pi M_{s\_ave}$ of the equation is the maximum value of the demagnetizing field. When $H_{k\_ass} - 4\pi M_{s\_ave} - H_h > 0$ holds, the assist by the microwave magnetic field is effectively obtained independent of the recording state. The maximum value of the demagnetizing field in this embodiment is 5.9 kOe, and the recording magnetic field of the magnetic head 502 during recording is 8.4 kOe, and this condition holds. If the magnetic storage device 500 has a recording magnetic field of the magnetic head 502 of approximately 8 kOe, and an average value of saturation magnetizations of the assist layer 506 and the recording layer 508 is approximately 500 emu/cc, if the anisotropic magnetic field of the assist layer 506 is at least approximately 14 kOe, the assist effect is obtained.

The recording magnetic field $H_h$ of the magnetic head 502 during recording may be replaced by the coercive force $H_c(t_0)$ of the magnetic recording medium 504 at the magnetic field sweep time to determined from the recording frequency. The reversal of magnetization occurs at the timing of the magnetic head 502 applying a recording magnetic field with the same value as the coercive force $H_c(t_0)$. The dependence on the magnetic field sweep time of the coercive force of the magnetic recording medium 504 is represented by the so-called Sharrock equation:

$$H_c(t) = H_0[1 - kT/K_u V \cdot \ln(At/0.693)^{1/2}]$$

In this equation, $H_c(t)$ is the coercive force at some magnetic field sweep time t; k is Boltzmann constant; T is the temperature; and the frequency factor A is $10^9$ s$^{-1}$. The magnetic recording medium of this embodiment has $H_0$ of 8.6 kOe and a thermal stability factor $K_u V/kT$ of 97. In this embodiment, the maximum recording frequency is 487 MHz, and the magnetic field sweep time is 1.0 ns which is one-half of the period. The coercive force at the magnetic field sweep time is determined to be 8.6 kOe from the above equation. Since the number in the first decimal place includes errors, this value may be the same as the value of the recording magnetic field of the magnetic head 502 during recording. Specifically, when $H_{k\_ass} - 4\pi M_{s\_ave} - H_c(t_0) > 0$ holds, the assist effect by the microwave magnetic field is effectively obtained.

Of the microwave magnetic fields generated by the STO 516, the in-plane component under the main magnetic pole 514 at a position slightly offset from the STO 516 is the microwave magnetic field effective in assisting. Therefore, the microwave magnetic field is only applied adequately near the surface layer of the magnetic recording medium 504 and rapidly decreases in the depth direction. Consequently, in the recording layer 508, the application of the microwave magnetic field is unsatisfactory, and an effective assist is not desired. On the one hand, the recording magnetic field of the magnetic head 502 passes through the soft magnetic underlayer of the magnetic recording medium 504 and maintains adequate intensity even in the recording layer 508.

Thus, in the plurality of magnetic layers forming the recording layer 508, when the anisotropic magnetic field of at least a portion of the magnetic layer is less than the anisotropic magnetic field of the assist layer 506, the reversal of magnetization caused by the recording magnetic field of the magnetic head 502 may be effectively started, and the recording characteristics may be improved.

Referring again to FIG. 7, in a first embodiment, the anisotropic magnetic field of the second magnetic layer 706 may be smaller than the anisotropic magnetic field of the assist layer 506, and the magnetization reversal of the recording layer 508 by the recording magnetic field of the magnetic head 502 may be effectively started. Since the anisotropic magnetic field increases as the Pt content increases in the CoPt alloy, a structure may be implemented that has a lower Pt content in the second magnetic layer 706 than the Pt content of the assist layer 506.

The anisotropic magnetic field of the first magnetic layer 702 may be the highest in the layers forming the magnetic recording medium 504. The reasons are that the average value of the anisotropic magnetic field of the entire magnetic recording medium 504 is held at a high level, and thermal stability is preserved. When the magnetization starts to reverse in the assist layer 506 and the second magnetic layer 706, the recording characteristics may be adequately maintained even if the anisotropic magnetic field of the first magnetic layer 702 is high because the accompanying magnetization reversal of the first magnetic layer 702 also starts.

As shown in FIG. 7, in one embodiment, an exchange coupling control layer 704 may be inserted between the first magnetic layer 702 and the second magnetic layer 706. By inserting an exchange coupling control layer 704 having the appropriate film thickness, the coercive force of the magnetic recording medium may be reduced without deteriorating thermal stability, and the recording characteristics may be further improved.

The read/write characteristics of a magnetic storage device having a magnetic head and magnetic recording medium according to this first embodiment were evaluated using a spin stand. Table 1 shows the results of evaluating the signal-to-noise ratio (SNR) when recording at one-half of the maximum recording frequency.

TABLE 1

| Head No. | Initial SNR (dB) | SNR Gain (dB) | Final SNR (B) |
|---|---|---|---|
| Head 1 | 9.8 | 1.6 | 11.4 |
| Head 2 | 8.8 | 2.2 | 11.0 |
| Head 3 | 10.3 | 1.3 | 11.6 |
| Head 4 | 9.5 | 1.8 | 11.3 |

The Initial SNR indicates the SNR when writing without applying a microwave magnetic field. The Final SNR indicates the SNR when writing while applying the microwave magnetic field. The SNR Gain is the difference between the Final SNR and the Initial SNR. Table 1 shows the results for four different magnetic heads. The SNR value differs with each magnetic head, but the SNR Gain is obtained by applying a microwave magnetic field due to the assist effect being obtained.

In the manufacturing process of a magnetic head, a plurality of elements are cut out of each wafer and incorporated in the respective magnetic head. There are performance differences in each head because of manufacturing fluctuations that depend on the position in the wafer. The frequency of the microwave magnetic field differs in each head and is in the range from a minimum of about 12 GHz to a maximum of about 30 GHz.

In a second embodiment, a magnetic recording medium 504 in which the assist layer 506 of the first embodiment was changed to a Co-19Cr-20Pt alloy was manufactured, and the read/write characteristics were evaluated as in the first embodiment. The saturation magnetization of the Co-19Cr-20Pt alloy is 380 emu/cc. The anisotropic magnetic field is 19.7 kOe. $H_0$ of the magnetic recording medium 504 of this embodiment is 8.8 kOe; $K_u V/kT$ is 100; and $H_c(t_0)$ is 8.8 kOe. The maximum value $4\pi M_{s\_ave}$ of demagnetizing field is 5.9 kOe. This comparative example satisfies the relationship of $H_{k\_ass} - 4\pi M_{s\_ave} - H_c(t_0) > 0$.

Table 2 shows the evaluation results.

TABLE 2

| Head No. | Initial SNR (dB) | SNR Gain (dB) | Final SNR (dB) |
|---|---|---|---|
| Head 1 | 9.4 | 1.9 | 11.3 |
| Head 2 | 8.3 | 2.9 | 11.2 |
| Head 3 | 10.0 | 1.7 | 11.7 |
| Head 4 | 9.0 | 2.2 | 11.2 |

The Initial SNR was low compared to the first embodiment, while SNR Gain was high compared to the first embodiment and the Final SNR was almost equal. When the anisotropic magnetic field of the assist layer 506 increases, the resonance frequency increases, and the assist effect due to the microwave magnetic field is enhanced. Therefore, in this embodiment, the SNR Gain increased. However, when the anisotropic magnetic field of the assist layer 506 increases, the average value of the anisotropic magnetic field of the entire magnetic recording medium 504 increases, and the recording performance degrades because the recording magnetic field of the magnetic head 502 is insufficient for the recording medium. Therefore, in this embodiment, the Initial SNR was lowered.

In order to increase the Initial SNR of this embodiment, the average value of the anisotropic magnetic field of the entire magnetic recording medium 504 may be decreased by lowering the anisotropic magnetic field of the first magnetic layer 702 or the second magnetic layer 706. However, thermal stability degrades when the anisotropic magnetic field of the first or second magnetic layers 702, 706 is reduced. It is helpful for the anisotropic magnetic field of the assist layer 506 to increase while lowering the anisotropic magnetic field of the first or second magnetic layers 702, 706 in the range where it is possible to maintain thermal stability for coping with both the recording characteristics and the assist effect.

As a comparative example, the read/write characteristics were evaluated as in the first embodiment with the Co-21Cr-12Pt alloy as the assist layer 506 of the magnetic recording medium 504. The saturation magnetization of the Co-21Cr-12Pt alloy is 370 emu/cc. The anisotropic magnetic field is 12.2 kOe. $H_0$ of the magnetic recording medium 504 of this comparative example is 8.3 kOe; $K_u V/kT$ is 92: and $H_c(t_0)$ is 8.3 kOe. The maximum value $4\pi M_{s\_ave}$ of the demagnetizing field is 5.8 kOe. This comparative example is $H_{k\_ass} - 4\pi M_{s\_ave} - H_c(t_0) < 0$. The conditions for efficiently obtaining assist are not satisfied.

Table 3 shows the evaluation results.

TABLE 3

| Head No. | Initial SNR (dB) | SNR Gain (dB) | Final SNR (dB) |
|---|---|---|---|
| Head 1 | 10.1 | 0.6 | 10.7 |
| Head 2 | 9.0 | 1.0 | 10.0 |
| Head 3 | 10.3 | 0.3 | 10.6 |
| Head 4 | 9.6 | 0.8 | 10.4 |

Compared to the first embodiment, the Initial SNR in this comparative example was at least the same, and the SNR Gain was lower than that in the first embodiment. The Final SNR is at least 11 dB in all cases of the first embodiment. In contrast, the final SNR of this comparative example is less than 11 dB, which is lower by at least 0.7 dB compared in all cases to the first embodiment. The anisotropic magnetic field of the assist layer 506 was too low to efficiently obtain an assist. However, the SNR Gain was not zero, and an assist although small was obtained. The microwave magnetic field becomes small in the recording layer, but is not zero, and the anisotropic magnetic field of the first magnetic layer 702 is high and contributes to the assist.

In a second comparative example, the read/write characteristics were evaluated as in the first embodiment with a Co-20Cr-20Pt-6SiOz alloy as the second magnetic layer 706 of the magnetic recording medium 504. The saturation magnetization of the Co-20Cr-20Pt-6SiO$_2$ alloy is 460 emu/cc. The anisotropic magnetic field is 19.0 kOe. H$_0$ of the magnetic recording medium 504 of this comparative example is 9.2 kOe; K$_u$V/kT is 102; and H$_c$(t$_0$) is 9.2 kOe. The maximum value 4πM$_{s\_ave}$ of the demagnetizing magnetic field is 6.2 kOe. This comparative example satisfies the relationship of H$_{k\_ass}$−4πM$_{s\_ave}$−H$_c$(t$_0$)>0.

Table 4 shows the evaluation results for the second comparative example.

TABLE 4

| Head No. | Initial SNR (dB) | SNR Gain (dB) | Final SNR (dB) |
|---|---|---|---|
| Head 1 | 9.2 | 1.8 | 11.0 |
| Head 2 | 8.0 | 2.5 | 10.5 |
| Head 3 | 9.7 | 1.4 | 11.1 |
| Head 4 | 8.7 | 1.9 | 10.6 |

Although this second comparative example has a high SNR gain compared to the first embodiment, the Initial SNR decreased. The results were that the Final SNR of this second comparative example decreased by at least 0.4 dB compared to the first embodiment, and the average value of the Final SNR was less than 11 dB. Because the anisotropic magnetic fields in all of the layers forming the recording layer 508 are higher than the anisotropic magnetic field of the assist layer 506, the anisotropic magnetic field of the recording layer 508 was too high as the recording magnetic field of the magnetic head 504. This causes the performance degradation. The high SNR Gain was caused by the increase in the anisotropic magnetic field of the second magnetic layer 706 and the increase in the resonance frequency of the magnetic recording medium 504. However, compared to when the anisotropic magnetic field of the assist layer 506 closest to the magnetic head 502 as shown in the second embodiment was high, the improvement in the assist effect of this second comparative example was not substantial, and the improvement in the SNR Gain was smaller.

In a third embodiment, the read/write characteristics were evaluated as in the first embodiment for each case when the film thickness of the assist layer 506 of the magnetic recording medium 504 of the first embodiment was 5.0 nm, 6.0 nm, and 7.0 nm. Table 5 shows the evaluation results.

TABLE 5

| Assist Layer Thickness | Head No. | Initial SNR (dB) | SNR Gain (dB) | Final SNR (dB) |
|---|---|---|---|---|
| 5.0 nm | Head 1 | 10.0 | 1.4 | 11.4 |
| | Head 2 | 9.1 | 2.0 | 11.1 |
| | Head 3 | 10.4 | 1.1 | 11.5 |
| | Head 4 | 9.6 | 1.7 | 11.3 |
| 6.0 nm | Head 1 | 10.2 | 1.0 | 11.2 |
| | Head 2 | 9.4 | 1.6 | 11.0 |
| | Head 3 | 10.4 | 0.8 | 11.2 |
| | Head 4 | 9.7 | 1.3 | 11.0 |

TABLE 5-continued

| Assist Layer Thickness | Head No. | Initial SNR (dB) | SNR Gain (dB) | Final SNR (dB) |
|---|---|---|---|---|
| 7.0 nm | Head 1 | 10.3 | 0.6 | 10.9 |
| | Head 2 | 9.7 | 1.0 | 10.7 |
| | Head 3 | 10.4 | 0.4 | 10.8 |
| | Head 4 | 9.9 | 0.7 | 10.6 |

Compared to the first embodiment, at the film thickness of 5.0 nm, the Initial SNR increased slightly, but the SNR Gain decreased slightly while the average value of the Final SNR was 11.3 dB and was equivalent to the first embodiment. At the film thicknesses of 6.0 nm and 7.0 nm, the Initial SNR increased, but the SNR Gain gradually degraded as the film thickness increased. At the film thickness of 6 nm, the average value of the Final SNR was 11.1 dB and was slightly lower than the first embodiment. The Final SNR was at least 11 dB in all cases, and a good SNR was obtained. In contrast, at the film thickness of 7 nm, the Final SNR in all cases was less than 11 dB.

As described above, the microwave magnetic field generated by the STO 516 rapidly decreased in the depth direction. Therefore, the intensity of the average microwave magnetic field becomes small for the entire assist layer 506 when the film thickness of the assist layer 506 becomes thicker, and the assist effect decreases. In this embodiment, the film thickness of the assist layer 506 is 5.0 nm, which is ½ of the recording layer 508, and the Final SNR was maintained at the same level as in the first embodiment. In order to cope with both the assist effect and recording characteristics, setting the film thickness of the assist layer 506 to one-half or less than that of the recording layer 508 is the most preferred. However, because a good SNR is obtained even when the film thickness of the assist layer 506 is 6.0 nm, the film thickness of the assist layer 506 may be approximately half of the recording layer 508 or greater, but less than a thickness of the recording layer 508.

Figure 8:
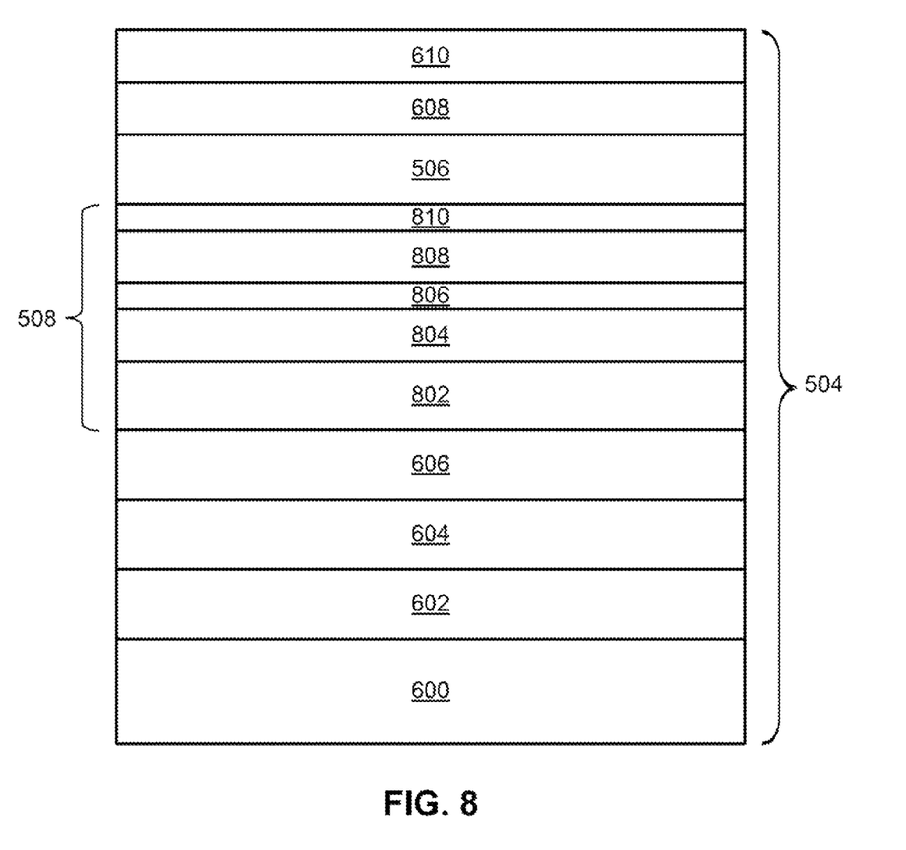
FIG. 8 shows a cross-sectional view of a magnetic recording medium according to one embodiment.

In a fourth embodiment, the magnetic recording medium 504 of the first embodiment was changed to the structure shown in FIG. 8, and the read/write characteristics were evaluated in the same manner. The substrate 600, adhesive layer 602, soft magnetic underlayer 604, crystal growth control layer 606, overcoating film 608, and lubricating film 610 are the same as those used in the first embodiment. The recording layer 508 is constructed by successively laminating a 3.6-nm thick first magnetic layer 802 comprising a Co-11Cr-19Pt-3SiO$_2$-3TiO$_2$-2Co$_3$O$_4$ alloy having saturation magnetization of 630 emu/cc and an anisotropic magnetic field of 20.4 kOe, a 2.2-nm thick second magnetic layer 804 comprising a Co-27Cr-14Pt-5SiO$_2$-3Co$_3$O$_4$ alloy having a saturation magnetization of 400 emu/cc and an anisotropic magnetic field of 15.4 kOe, a 0.8-nm thick exchange coupling control layer 806 comprising a Co-40Cr-6SiO$_2$-3Co$_3$O$_4$ alloy, and a 3.8-nm thick third magnetic layer 808 comprising a Co-21Cr-20Pt-3SiO$_2$-3TiO$_2$-2Co$_3$O$_4$ alloy having a saturation magnetization of 450 emuicc and an anisotropic magnetic field of 19.2 kOe. A Co-40Cr-6SiO$_2$-3Co$_3$O$_4$ alloy was deposited as a 0.4-nm thick film as an exchange coupling control layer 810 on the third magnetic layer 808. Then, a 2.0-nm thick film of a Co-11Cr-21 Pt-7B alloy having saturation magnetization of 570 emu/cc and an anisotropic magnetic field of 17.2 kOe was deposited as the assist layer 506 thereabove. In this embodiment, the H$_0$ of the magnetic recording medium 504 was 9.0 kOe; K$_u$V/kT is 93; and H$_c$(t$_0$) is 9.0 kOe. The maximum value 4πM$_{s\_ave}$ of the demagnetizing field is 6.5 kOe. This fourth embodiment satisfies the relationship of H$_{k\_ass}$−4πM$_{s\_ave}$−H$_c$(t$_0$)>0.

Table 6 shows the evaluation results for the fourth embodiment.

TABLE 6

| Head No. | Initial SNR (dB) | SNR Gain (dB) | Final SNR (dB) |
|---|---|---|---|
| Head 1 | 10.9 | 1.5 | 12.4 |
| Head 2 | 10.1 | 2.0 | 12.1 |
| Head 3 | 11.0 | 1.5 | 12.5 |
| Head 4 | 10.3 | 1.8 | 12.1 |

Compared to the first embodiment, this fourth embodiment has a higher Initial SNR, nearly the same SNR Gain, and a higher Final SNR. In addition to the anisotropic magnetic field of the second magnetic layer 804 being smaller than the anisotropic magnetic field of the assist layer 506, more layers were used in the magnetic layers forming the recording layer 508, a plurality of exchange coupling control layers were used, and thus the recording characteristics of the medium were improved to be more suitable for the recording magnetic field of the head. This caused the improvement of the initial SNR.

Figure 9:
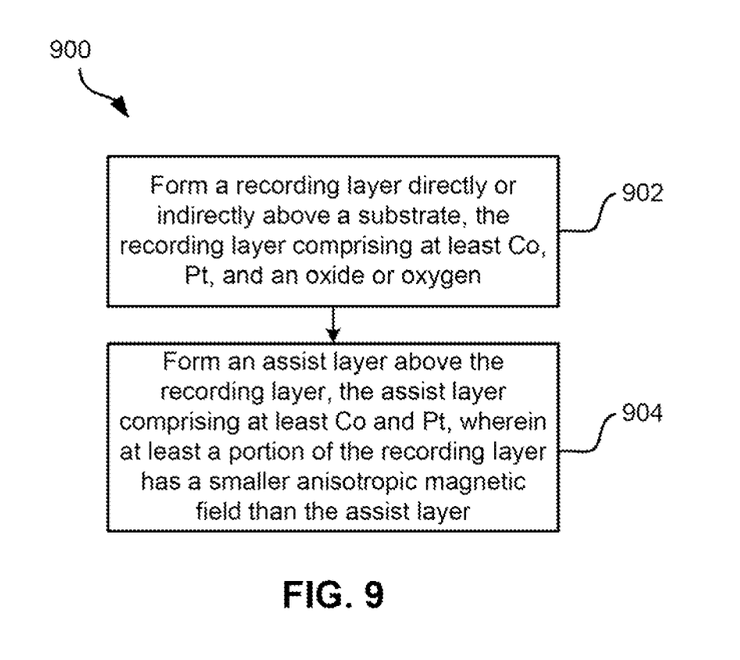
FIG. 9 is a flowchart of a method according to one embodiment.

Now referring to FIG. 9, a method 900 for forming a magnetic recording medium is shown according to one embodiment. The method 900 may be performed in accordance with the present invention in any of the environments depicted in FIGS. 1-8, among others, in various embodiments. Of course, more or less operations than those specifically described in FIG. 9 may be included in method 900, as would be understood by one of skill in the art upon reading the present descriptions.

Any formation technique may be used to form any of the layers, structures, films, and other components of method 900 described herein, such as sputtering, plating, spin coating, chemical vapor deposition (CVD), atomic layer deposition (ALD), physical vapor deposition (PVD), etc.

Furthermore, any magnetic material may be used to form the magnetic layers described in method 900, such as alloys of Co and Pt, specifically $Co\text{-}40Cr\text{-}6SiO_2\text{-}3Co_3O_4$, $Co\text{-}11Cr\text{-}21Pt\text{-}7B$, $Co\text{-}21\ Cr\text{-}20Pt\text{-}3SiO_2\text{-}3TiO_2\text{-}2Co_3O_4$, $Co\text{-}27Cr\text{-}14Pt\text{-}5SiO_2\text{-}3Co_3O_4$, $Co\text{-}11Cr\text{-}19Pt\text{-}3SiO_2\text{-}3TiO_2\text{-}2Co_3O_4$, etc., or any other suitable materials known in the art.

The method 900 may begin with operation 902, where a recording layer is formed directly or indirectly above a substrate, the recording layer comprising at least Co, Pt, and an oxide or oxygen. Any of the previously described materials may be used or others known in the art.

In operation 904, an assist layer is formed above the recording layer, the assist layer comprising at least Co and Pt. The assist layer is positioned closer to an ABS of a magnetic head after formation thereof when the magnetic recording medium is in operation in a magnetic storage device. The assist layer may be formed as known by one of skill in the art. In one embodiment, the assist layer may comprise alloys of Co and Pt, which may include Cr or other suitable materials known in the art.

In one approach, at least a portion of the recording layer has a smaller anisotropic magnetic field than the assist layer. This may be caused by the recording layer having a lower Pt content than the assist layer.

According to one embodiment, a relationship between an anisotropic magnetic field ($H_{k\_ass}$) of the assist layer, an average value ($M_{s\_ave}$) of saturation magnetizations of the assist layer and the recording layer, and a recording magnetic field ($H_h$) of the magnetic head is $H_{k\_ass} - 4\pi M_{s\_ave} - H_h > 0$.

In another embodiment, a relationship between the anisotropic magnetic field ($H_{k\_ass}$) of the assist layer, the average value ($M_{s\_ave}$) of saturation magnetizations of the assist layer and the recording layer, and a coercive force ($H_c(t_0)$) of the magnetic recording medium at a magnetic field sweep time ($t_0$) determined from a recording frequency is $H_{k\_ass} - 4\pi M_{s\_ave} - H_0(t_0) > 0$.

According to the embodiments described herein, a magnetic storage device may be manufactured that has a high assist effect provided by a microwave magnetic field and have satisfactory recording characteristics that enable high recording densities.

It should be noted that methodology presented herein for at least some of the various embodiments may be implemented, in whole or in part, in computer hardware, software, by hand, using specialty equipment, etc. and combinations thereof.

Moreover, any of the structures and/or steps may be implemented using known materials and/or techniques, as would become apparent to one skilled in the art upon reading the present specification.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic recording medium, comprising:
    a recording layer positioned directly or indirectly above a substrate, the recording layer comprising at least Co, Pt, and an oxide or oxygen; and
    an assist layer positioned above the recording layer, the assist layer being positioned closer to a head-facing side of the magnetic recording medium than the recording layer, the assist layer comprising at least Co and Pt,
    wherein at least a portion of the recording layer has a smaller anisotropic magnetic field than the assist layer, and
    wherein a relationship between an absolute value of an anisotropic magnetic field ($H_{k\_ass}$) of the assist layer measured in Oe, an absolute value of an average value ($M_{s\_ave}$) of saturation magnetizations of the assist layer and the recording layer measured in emu/cc, and an absolute value of a coercive force ($H_c(t_0)$) of the magnetic recording medium at a magnetic field sweep time ($t_0$) determined from a recording frequency measured in Oe is $H_{k\_ass} - 4\pi M_{s\_ave} - H_0(t_0) > 0$.

2. The magnetic recording medium as recited in claim 1, characterized in that the anisotropic magnetic field of the assist layer is about 14 kOe or more.

3. The magnetic recording medium as recited in claim 1, wherein the recording layer comprises a plurality of magnetic layers, and wherein at least one of the magnetic layers comprises a lower Pt content than the assist layer and has an anisotropic magnetic field that is smaller than the anisotropic magnetic field of the assist layer.

4. The magnetic recording medium as recited in claim 3, further comprising exchange coupling control layers positioned between the assist layer and the recording layer, and between each of the plurality of magnetic layers.

5. The magnetic recording medium as recited in claim 1, wherein the recording layer comprises:
    a first magnetic layer;
    an exchange coupling layer positioned above the first magnetic layer; and a second magnetic layer positioned above the exchange coupling layer, wherein the second magnetic layer comprises a lower Pt content lower than the assist layer and has an anisotropic magnetic field that is smaller than the anisotropic magnetic field of the assist layer.

6. The magnetic recording medium as recited in claim 1, wherein the portion of the recording layer that has the smaller anisotropic magnetic field than the assist layer also has a lower Pt content than the assist layer.

7. The magnetic recording medium as recited in claim 1, characterized in that a film thickness of the recording layer is at least twice that of a film thickness of the assist layer.

8. The magnetic recording medium as recited in claim 1, further comprising an exchange coupling control layer positioned between the assist layer and the recording layer.

9. A magnetic storage device, comprising:
at least one magnetic head, each magnetic head comprising a microwave magnetic field oscillation element;
a magnetic recording medium as recited in claim 1;
a drive mechanism for passing the magnetic medium over the at least one magnetic head; and
a controller electrically coupled to the at least one magnetic head for controlling operation of the at least one magnetic head.

10. The magnetic recording medium as recited in claim 9, characterized in that a relationship between the absolute value of the anisotropic magnetic field ($H_{k\_ass}$) of the assist layer measured in Oe, the absolute value of the average value ($M_{s\_ave}$) of saturation magnetizations of the assist layer and the recording layer measured in emu/cc, and an absolute value of a recording magnetic field ($H_h$) of the at least one magnetic head measured in Oe is $H_{k\_ass} - 4\pi M_{s\_ave} - H_h > 0$.

11. The magnetic recording medium as recited in claim 10, characterized in that the anisotropic magnetic field of the assist layer is about 14 kOe or more.

12. A method for forming a magnetic recording medium, the method comprising
forming a recording layer directly or indirectly above a substrate, the recording layer comprising at least Co, Pt, and an oxide or oxygen;
forming an exchange coupling control layer above the recording layer; and
forming an assist layer above the exchange coupling layer and the recording layer, the assist layer comprising at least Co and Pt,
wherein at least a portion of the recording layer has a smaller anisotropic magnetic field than the assist layer, and
wherein a relationship between an absolute value of an anisotropic magnetic field ($H_{k\_ass}$) of the assist layer measured in Oe, an absolute value of an average value ($M_{s\_ave}$) of saturation magnetizations of the assist layer and the recording layer measured in emu/cc, and an absolute value of a coercive force ($H_c(t_0)$) of the magnetic recording medium measured in Oe at a magnetic field sweep time ($t_0$) determined from a recording frequency is $H_{k\_ass} - 4\pi M_{s\_ave} - H_0(t_0) > 0$.

13. The method as recited in claim 12, characterized in that a relationship between the absolute value of an anisotropic magnetic field ($H_{k\_ass}$) of the assist layer measured in Oe, the absolute value of the average value ($M_{s\_ave}$) of saturation magnetizations of the assist layer and the recording layer measured in emu/cc, and an absolute value of a recording magnetic field ($H_h$) of a magnetic head measured in Oe is $H_{k\_ass} - 4\pi M_{s\_ave} - H_h > 0$.

14. A magnetic storage device, comprising:
at least one magnetic head, each magnetic head comprising a microwave magnetic field oscillation element;
a magnetic recording medium, comprising:
a recording layer positioned directly or indirectly above a substrate, the recording layer comprising at least Co, Pt, and an oxide or oxygen; and
an assist layer positioned above the recording layer, the assist layer being positioned closer to a head-facing side of the magnetic recording medium than the recording layer, the assist layer comprising at least Co and Pt,
wherein at least a portion of the recording layer has a smaller anisotropic magnetic field than the assist layer, and
wherein a relationship between the absolute value of the anisotropic magnetic field ($H_{k\_ass}$) of the assist layer measured in Oe, the absolute value of the average value ($M_{s\_ave}$) of saturation magnetizations of the assist layer and the recording layer measured in emu/cc, and an absolute value of a recording magnetic field ($H_h$) of the at least one magnetic head measured in Oe is $H_{k\_ass} - 4\pi M_{s\_ave\_Hh} > 0$,
a drive mechanism for passing the magnetic medium over the at least one magnetic head; and
a controller electrically coupled to the at least one magnetic head for controlling operation of the at least one magnetic head.

15. The magnetic storage device as recited in claim 14, wherein a relationship between the absolute value of the anisotropic magnetic field ($H_{k\_ass}$) of the assist layer measured in Oe, the absolute value of the average value ($M_{s\_ave}$) of saturation magnetizations of the assist layer and the recording layer measured in emu/cc, and an absolute value of a coercive force ($H_c(t_0)$) of the magnetic recording medium measured in Oe at a magnetic field sweep time ($t_0$) determined from a recording frequency is $H_{k\_ass} - 4\pi M_{s\_ave\_H0}(t_0) > 0$.

16. The magnetic storage device as recited in claim 14, wherein the magnetic recording medium further comprises an exchange coupling control layer positioned between the assist layer and the recording layer.

17. The magnetic storage device as recited in claim 14, wherein the portion of the recording layer that has the smaller anisotropic magnetic field than the assist layer also has a lower Pt content than the assist layer.

18. The magnetic storage device as recited in claim 14, wherein the magnetic recording layer is characterized in that a film thickness of the recording layer is at least twice that of a film thickness of the assist layer.

19. The magnetic storage device as recited in claim 14, wherein the recording layer comprises a plurality of magnetic layers, and wherein at least one of the magnetic layers comprises a lower Pt content than the assist layer and has an anisotropic magnetic field that is smaller than the anisotropic magnetic field of the assist layer.

* * * * *